United States Patent [19]

Van den Heuvel et al.

[11] Patent Number: 5,301,359
[45] Date of Patent: Apr. 5, 1994

[54] BULLETIN BOARD RESOURCE FOR COMMUNICATION SYSTEM ACCESS

[75] Inventors: Anthony P. Van den Heuvel, Parkland, Fla.; Richard A. Comroe, Dundee, Ill.; Arun Sobti, Wheaton, Ill.; Anthony J. Sarli, Jr., Palatine, Ill.

[73] Assignee: Motorola, Inc., Schaumburg, Ill.

[21] Appl. No.: 76,924

[22] Filed: Mar. 9, 1993

Related U.S. Application Data

[63] Continuation of Ser. No. 344,176, Apr. 27, 1989, abandoned.

[51] Int. Cl.⁵ .................................................. H04Q 7/00
[52] U.S. Cl. ................................ 455/56.1; 455/54.1; 455/33.1; 455/34.1
[58] Field of Search .......... 455/33, 54, 56, 9, 88, 455/854, 156, 34.1, 2, 56.1, 15, 33.1, 38.4, 54.1, 54.2; 340/825.44; 370/95.2, 95.1; 379/59, 60; 358/85

[56] References Cited

U.S. PATENT DOCUMENTS

| | | | |
|---|---|---|---|
| 4,251,805 | 2/1981 | Moore et al. | 370/95.2 |
| 4,633,509 | 12/1986 | Scheinert | 455/38 |
| 4,736,453 | 4/1988 | Schloemer | 455/67 |
| 4,748,681 | 5/1988 | Schmidt | 370/95.1 |
| 4,850,033 | 7/1989 | Eizenhofer et al. | 455/56 |
| 4,876,738 | 10/1989 | Selby | 379/59 |
| 4,905,301 | 2/1990 | Krolopp et al. | 455/34.1 |
| 5,003,629 | 3/1991 | Ness-Cohn et al. | 455/56.1 |
| 5,058,199 | 10/1991 | Grube | 455/54.2 |
| 5,125,103 | 6/1992 | Grube et al. | 455/33.1 |

FOREIGN PATENT DOCUMENTS 2750071 5/1979 Fed. Rep. of Germany.

OTHER PUBLICATIONS

Tellabs Advertisement; *Telephony* Oct. 1980, p. 2.

*Primary Examiner*—Edward L. Coles, Sr.
*Assistant Examiner*—Jill Jackson
*Attorney, Agent, or Firm*—Steven G. Parmelee; Susan L. Lukasik

[57] ABSTRACT

A bulletin board communication resource provides a message to communication units regarding available communication systems in a particular geographic area. The bulletin board resource also supports registration of the communication unit with one or more of these systems as selected by the communication unit.

24 Claims, 2 Drawing Sheets

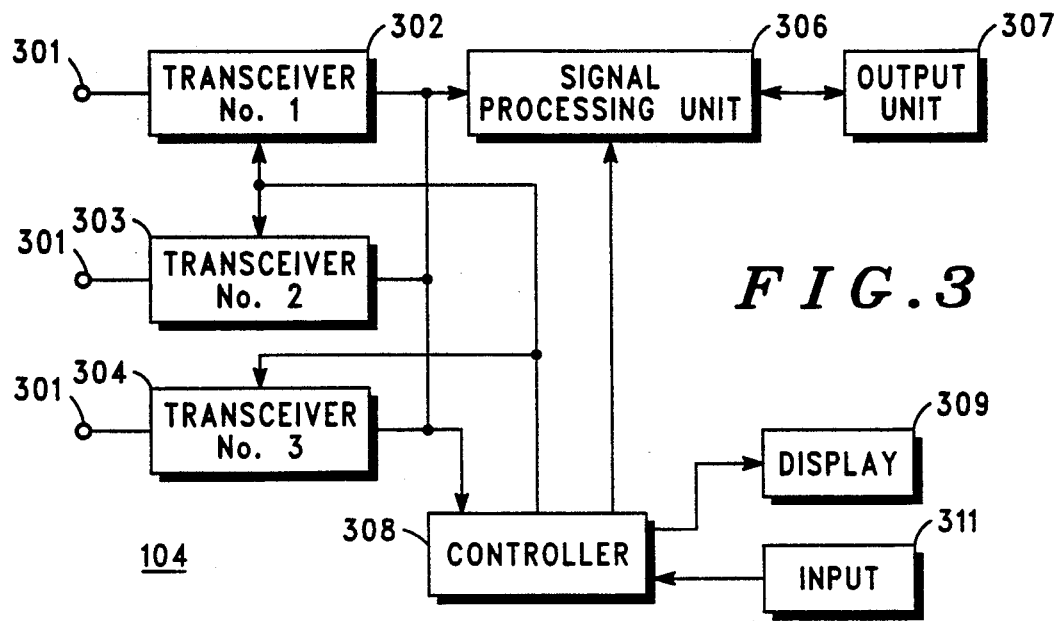
FIG. 3
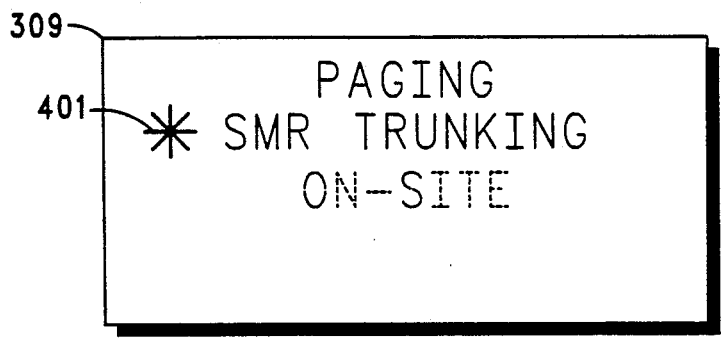
FIG. 4
FIG. 5A
FIG. 5B

BULLETIN BOARD RESOURCE FOR COMMUNICATION SYSTEM ACCESS

This is a continuation of application Ser. No. 07/344,176, filed Apr. 27, 1989 and now abandoned.

TECHNICAL FIELD

This invention relates generally to RF communication systems, and particularly to methodologies that allow a communication unit to access more than one type of communication system.

BACKGROUND ART

RF communication systems in many varied forms are well understood in the art. For example, wide area low bandwidth systems (such as paging systems) typically provide one way communications on relatively narrow channels at relatively low bit rates (such as 1200 bps). Medium area systems, such as SMR trunking, provide more functionality over a more limited geographic area and rely in part upon a higher bit rate (such as 3600 bps) to support necessary data communications. Limited coverage high bandwidth systems are also known, and typically require the use of much higher bandwidth channels (such as 200 kHz to 2 MHz) and much higher bit rates (such as 270 kbps to 1.6 mbps). Examples of such systems are digital cellular communications systems as envisioned pursuant to the GSM program, and the digital electronic cordless telephone (DECT) program intended for on-site applications.

As is known in the art, these systems are collectively similar in that each communication supported by these communication systems necessarily includes an RF wireless communication link.

These and other systems are, or will soon be, found in numerous locations throughout the world, and often in overlapping configurations. That is to say, in a given metropolitan area, a particular communication user may have theoretical access to a plurality of communication systems. Since these communication systems tend to have differing operating characteristics, however, such as differing bit rates, bandwidths, signalling protocols, registration requirements and the like, in practice a single user will only be able to access such multiple systems by obtaining multiple communication units that are each compatible with one of the systems. For example, to obtain benefit of only some of the RF services available in his area, a user may equip his automobile with a mobile cellular telephone, one or more land mobile radios (to allow access to one or more trunked or conventional land mobile systems), and a mobile data terminal to allow exchange of data. In addition, the user may himself carry a pager.

The necessity of obtaining, maintaining, and operating all of this equipment to gain access to only a few of the RF communication services offered in a particular area is undesirable. A need exists for a communication unit that can readily access more than one type of communication system, and for an infrastructure that will accommodate such a communication unit to afford access to the differing communication systems.

BRIEF DESCRIPTION OF THE DRAWINGS

FIG. 3 comprises a block diagram depiction of a portion of a communication unit;

FIG. 4 comprises a detailed depiction of a display for the communication unit; and FIGS. 5A and 5B comprise timing diagrams of bulletin board resource signalling.

BEST MODE FOR CARRYING OUT THE INVENTION

Figure 1:
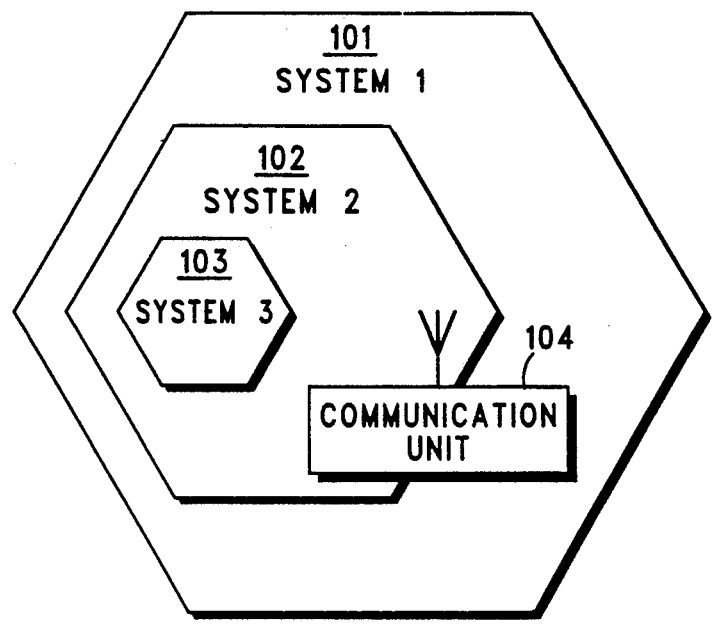
FIG. 1 comprises a generalized geographic depiction of an area having multiple, but differing, communication systems.

In FIG. 1, the invention is perhaps more readily explained by presuming a geographic setting that includes three differing RF communication systems; system 1 (101), system 2 (102), and system 3 (103). System 1 (101) may be, for example, a wide area paging service that covers a relatively wide geographic area with a relatively simple grade of selective call one-way service. System 2 (102) may be, for example, an SMR 800 MHz RF communication system wherein two-way voice (and/or data) communications are supported within a somewhat smaller geographic area through appropriately allocated RF frequency resources. Lastly, system 3 (103) may be, for example, an on-site RF communication system that makes use of a wide bandwidth high bit rate configuration to provide a wide functionality capability over a relatively limited geographic area (such as within a building or over a business campus).

A communication unit (104) (which may be either a mobile or portable unit) may be found at various times in different geographic locations, and hence within range of various combinations of RF service availability. For example, in the geographic position depicted in FIG. 1, the communication unit (104) could have access to either system 1 (101) or system 2 (102).

Figure 2:
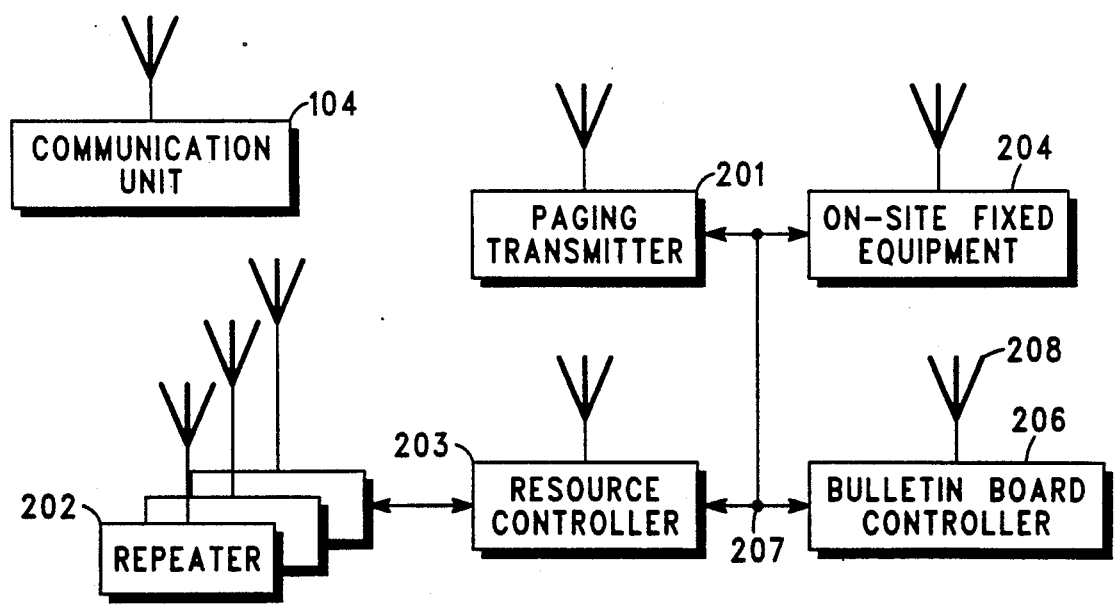
FIG. 2 comprises a block diagram depiction of the invention as configured in a multi-system environment.

In FIG. 2, system 1 (101) includes generally one or more paging transmitters (201), system 2 (102) includes a plurality of repeaters (202) and a resource controller (203) to at least partially control allocation of the repeaters amongst users, and system 3 (103) includes appropriate on-site fixed equipment (204) to facilitate support of its services, all as in accordance with well understood prior art technique. In addition, pursuant to this invention, a bulletin board controller (206) couples to the infrastructure (201, 203, and 204) for each of the systems (101, 102, and 103), through an appropriate communication link (207) (which link may be any appropriate medium of information exchange, including temporary or dedicated landlines, or RF links). So linked, the bulletin board controller (206) can provide information to the various systems, such as registration information as described below. In addition, the bulletin board controller (206) can receive information from the various systems, such as current functionality, loading, and other information pertinent to the current availability of the individual systems and their services.

The bulletin board controller (206) also includes an independent RF link (208) by which the bulletin board controller (206) can transmit and receive pertinent information regarding access to the various communication systems, also as described below.

In FIG. 3, the communication unit (104) appears in more detail.

The communication unit (104) includes one or more appropriate antennas (not shown), and antenna switches (not shown) to control coupling of this antenna (or antennas) as well understood in the art. This structure then couples (301) to a plurality of transceivers (302-304). In this embodiment, each transceiver is capable of accommodating the particular operating characteristics of a particular communication system, including bandwidth, bit rate, and the like. (It would of course be possible, in an appropriate embodiment, to provide a single transceiver that would have sufficiently variable operating characteristics as to allow the transceiver to be appropriately configured to operate in satisfactory conjunction with any of the differing operating characteristics of the various communication systems.) The outputs of the transceivers (302-304) then couple to an appropriate signal processing unit (306), which itself couples to an appropriate output unit (307). For example, if voice messages are received, the signal processing unit (306) can appropriately recover and process these signals and the output unit (307) can render these signals audible. If data signals are received, the signal processing unit (306) can appropriately decode the message and provide the recovered message to the output unit (307), which may include a graphic display to allow the data to be displayed and read.

The transceiver outputs also couple to an appropriate controller (308) such as a microprocessor satisfactory to the application. The controller (308) itself couples to a display unit (309) and an input unit (311). So configured, an operator can provide appropriate input control information to the controller via the input (311), and the controller (308) can provide output information in an appropriate form via the display (309) for benefit of the operator.

So configured, the controller (308) can control which of the transceivers (302-304) operates in the communication unit (104) and can additionally function to decode at least some of the signals received by the transceivers and provide information to an operator via the display (309) regarding such decoded information.

Operation of the system may now be described. The bulletin board controller (206) transmits on a bulletin board outbound communication resource, such as a dedicated RF frequency. (Preferably, this outbound resource will be substantially universally standardized for this particular function to enable rapid acquisition of the bulletin board resource by a communication unit. In the alternative, the particular outbound resource used by a particular bulletin board controller may be one of a number of resources that are dedicated to and standardized for transmission of bulletin board information. As a lessor desirable alternative, this resource may simply be a dedicated resource for a particular geographic area, and the communication unit would be required to locate this resource either through an appropriate scan mechanism or by direction of the operator).

In FIG. 5a, this outbound bulletin board resource would include a transmission from the bulletin board controller (206), from time to time, of a menu message (501). This menu message (501) would include information regarding available communication systems. This information could include information regarding identification of the service itself (i.e., wide area paging service, SMR service, on-site service, cellular service, encrypted voice service, data capability, community repeater access, and the like), control resource information and/or specific interface protocols (if any), unusual operating parameter information that the communication unit might be configured to conform information (such as frequencies, frequency pairing, channel spacing, deviation tolerances, TDM time frame and slot information, and the like), cost information, and other pertinent information as may be appropriate to a particular system, including access availability.

The communication unit (104), upon locating the outbound bulletin board resource, receives the menu message (501) and appropriately processes it to recover the above indicated information. The communication unit (104) can then provide for selection of one or more of the available services, either on an automatic basis or by direct operator intervention. Having selected the appropriate system or systems desired, the communication unit (104) can source a registration request message (502) (FIG. 5b) on a bulletin board inbound resource that is associated with the bulletin board outbound resource (this could be accomplished, for example, by paired frequencies, dedicated time slots in a single channel system, or with a simpler contention based single channel resource).

The bulletin board controller (206) receives the registration request (502) and provides for appropriate registration of the communication unit (104) with the communication systems as selected by the communication unit (104). In this embodiment, the bulletin board controller (206) then transmits a registration grant (503) to the communication unit (104) to acknowledge the registration request (502) and to indicate communication system access as requested has been granted. The communication unit (104) can then select the transceiver appropriate to the system and service selected, and begin operation as a communication entity within the selected system using the information provided by the bulletin board resource.

If desired, the communication unit (104) can occasionally use its unselected transceivers to briefly monitor other available systems, the identities of which are known to the communication unit (104) due to the menu message (501). By this mechanism, the communication unit (104) can occasionally determine the availability status, due to its geographic location, of the various systems located within the geographic area governed by the bulletin board controller (206). With this information, the communication unit (104) can alter its own system status automatically on a prioritized basis as more desired systems become available due to movement of the communication system (104) throughout the area, or the availability of the other systems can simply be made known to the operator.

In FIG. 4, one embodiment of the communication unit provides a display (309) that includes an alphanumeric display of the systems that are indicated in the menu message. For example, in the description noted above, the bulletin board controller (206) would indicate availability of three systems, the paging system (101), the SMR trunking system (102), and the on-site system (103). All three systems could be displayed to provide the operator with information regarding general availability of these systems. The paging and SMR trunking systems are displayed in bold lettering to provide notice that both systems are currently within range of the communication unit (104) and that either could be selected by the unit. The on-site system, although noted on the display as generally available in the area, is depicted in non-boldface characters to indicate that the on-site system is not currently accessible to the communication unit (104), in this case because of geographic range limitations.

The display may also include an appropriate indicia (401) of the system or systems that have been selected by the communication unit (104) and with which the communication unit (104) has been registered via the bulletin board controller (206). In FIG. 4, this indicator (401) provides notice that the communication unit (104) currently functions as a trunked land mobile radio operating within the SMR trunking system (102).

What is claimed is:

1. A method of providing communication system access for a 2-way wireless radio frequency (RF) communication unit as between at least two RF communication systems, wherein the at least two RF communication systems are independent of one another, and wherein each communication supported by the at least two RF communication systems necessarily includes an RF wireless communication link, comprising the steps of:
   A) monitoring, by the 2-way wireless RF communication unit, an RF bulletin board resource to obtain information regarding each of the at least two RF communication systems;
   B) transmitting to the 2-way wireless RF communication unit on the RF bulletin board resource registration information of at least one of the at least two RF communication systems.

2. The method of claim 1 wherein the at least two RF communication systems have differing operating characteristics.

3. The method of claim 1 wherein the RF bulletin board resource is substantially independent of all of the at least two RF communication systems.

4. The method of claim 1 wherein the step of monitoring includes obtaining the information in the form of a data message.

5. The method of claim 1 wherein the step of transmitting includes transmitting the information as a data message.

6. The method of claim 1 wherein the information monitored and the information transmitted is monitored and transmitted as data messages.

7. The method of claim 1 and further including the step of:
   C) receiving on the RF bulletin board resource information regarding acknowledgment of the registration information.

8. The method of claim 7 and further comprising the step of:
   D) beginning communications operation on at least one of the at least two RF communications systems for which registration information was transmitted.

9. The method of claim 1 wherein the monitoring information obtained in the monitoring step includes at least identification information of the at least two RF communication systems.

10. The method of claim 9 wherein the step of monitoring includes the step of:
    A1) displaying at least part of the identification information.

11. A method of providing to a 2-way wireless radio frequency (RF) communication unit information regarding communication system capabilities for at least a first and second RF communication systems, wherein the first and second RF communication systems are independent from one another and have differing operating characteristics, and wherein each communication supported by the first and second RF communication systems necessarily includes an RF wireless communication link, comprising the steps of:
    A) monitoring an RF bulletin board resource that is independent of both the first and second RF communication systems;
    B) receiving information on the RF bulletin board resource regarding at least the first and second RF communication systems.

12. A method of enabling a 2-way wireless radio frequency (RF) communication unit, comprising the steps of:
    A) locating, via the 2-way wireless RF communication unit, an RF bulletin board resource that transmits information regarding a plurality of independent available RF communication systems, wherein each communication supported by the at least two RF communication systems necessarily includes an RF wireless communication link;
    B) receiving the information;
    C) selecting, via the 2-way wireless RF communication unit, at least one desired RF communication system from said plurality of independent available RF communication systems.

13. The method of claim 12 wherein the RF bulletin board resource is substantially independent of the available RF communication systems.

14. The method of claim 12 wherein the step of receiving the information includes the step of:
    B1) providing a display related at least in part to at least some of the information.

15. The method of claim 12 wherein the step of selecting includes the step of:
    C1) providing a display providing information relating to the at least one RF desired communication system.

16. The method of claim 12 wherein the step of receiving the information includes the step of providing a display of at least some of the information, and wherein the step of selecting includes a step of providing a display regarding the at least one desired RF communication system.

17. A method of enabling a 2-way wireless radio frequency (RF) communication unit, comprising:
    A) locating an RF bulletin board resource that transmits information regarding a plurality of independent available RF communication systems, wherein each communication supported by the at least two RF communication systems necessarily includes an RF wireless communication link;
    B) receiving the information;
    C) selecting at least one desired RF communication system, wherein the step of selecting includes a step of transmitting a request to operate on the at least one desired RF communication system.

18. The method of claim 12 wherein the step of selecting further includes the step of receiving an acknowledgment of a request to operate on the at least one desired RF communication system.

19. The method of claim 18 wherein the step of selecting further includes the step of locating the desired RF communication system and beginning operation as an RF communication unit within that RF communication system.

20. The method of claim 12 and including the further the steps of:
    D) determining that the desired RF communication system is unavailable;
    E) repeating from step A.

21. A 2-way wireless radio frequency (RF) communication unit capable of compatibly operating in a plurality of RF communication systems that have different operating characteristics from one another, wherein each communication supported by the at least two RF communication systems necessarily includes an RF wireless communication link, the 2-way wireless RF communication unit comprising:

A) transceiver means for allowing the 2-way wireless RF communication unit to transceive on at least some RF communication resources;

B) control means for controlling the transceiver means by selectively;

i) causing the transceiver means to communicate on an RF bulletin board resource to obtain information regarding available RF communication systems that are independent from one another;

ii) causing the transceiver means to communicate on the RF bulletin board resource to select at least one of the available RF communication systems; and iii) causing the transceiver means to communicate on an RF communication resource associated with said selected at least one of said available RF communication systems.

22. The 2-way wireless RF communication unit of claim 21 wherein the 2-way wireless RF communication unit further includes display means responsive to the control means for displaying at least some information regarding said available RF communication systems.

23. The 2-way wireless RF communication unit of claim 22 wherein the display means further displays information regarding said selected at least one of said available RF communication systems.

24. A method for providing communication system access for a 2-way wireless radio frequency (RF) communication unit as between at least two RF communication systems, wherein the at least two RF communication systems are independent of one another and the at least two RF communication systems provide one or more RF communications service, and wherein each communication supported by the at least two RF communication systems necessarily includes an RF wireless communication link, comprising the steps of:

A) monitoring an RF bulletin board resource to obtain information regarding at least one of the one or more RF communication services offered by each of the at least two RF communication systems;

B) transmitting on the RF bulletin board resource registration information for at least one RF communication service of the at least two RF communication systems.

* * * * *